Patented Dec. 16, 1941

2,266,282

UNITED STATES PATENT OFFICE 2,266,282

PROCESS FOR MAKING PHYTOCHLORIN E

Eric G. Snyder, New York, N. Y., assignor to Jovan Laboratories, Inc., New York, N. Y., a corporation of New York No Drawing. Application August 1, 1939, Serial No. 287,754

5 Claims. (Cl. 260—314)

The present invention relates to a process for making phytochlorin e and to bacteriostatic substances containing the aforesaid phytochlorin e.

It is an object of the present invention to provide a process for making phytochlorin e-sodium.

It is another object of the present invention to provide a means for making bacteriostatic substances containing phytochlorin e.

It is a further object of the present invention to provide means for utilizing chlorin e as a bacteriostatic substance.

The present invention also contemplates the provision for using materials containing phytochlorin e as bacteriostatic substances.

Other objects and advantages will become apparent to those skilled in the art from the following description.

In general the present invention relates to a process for preparing phytochlorins. However, in one aspect the present invention relates to a new process for making the tri-sodium salt or the tri-potassium salt of phytochlorin e.

The tri-sodium or tri-potassium salt of phytochlorin e may be made in accordance with the principles of the present invention from pheophorbides a, for example, from pheophytin a. Thus, one part by weight of commercially pure pheophytine a is added to ten parts by weight of a concentrated solution, preferably a saturated solution, of sodium hydroxide in 98% methyl alcohol. The mixture or suspension is boiled under a reflux condenser for several hours, preferably about 7 hours. During the reaction period it is preferable to exclude the carbon dioxide of the air by any suitable means, such as a soda lime seal. The refluxed mixture is allowed to cool and stand for a period of several hours, say about 12 hours, preferably at a temperature of about 10° C. or less, during which time the sodium salt of phytochlorin e is precipitated. The precipitate is separated from the liquid phase by filtration or centrifuging or decantation and the solid material washed, substantially free of alkali with absolute alcohol, then with petroleum ether and finally dried preferably in a vacuum.

The tri-potassium salt may be made in a similar manner by adding one part of substantially pure pheophytin a to ten parts of a solution of potassium hydroxide in methyl alcohol. The potassium hydroxide solution may be made by dissolving one part by weight of potassium hydroxide in five parts by weight of 98% methyl alcohol. Concentrations as low as about 12% KOH and as high as about 30% KOH may be employed. The caustic methyl alcohol suspension of pheophytin is boiled under a reflux condenser for several hours, say about 5 hours, during which time it is preferred to exclude the carbon dioxide of the air in any suitable manner. After the refluxing operation is completed the reaction mass is allowed to cool and stand until the potassium salt of phytochlorin e is precipitated out. Usually 12 hours is sufficient. The precipitated potassium salt is separated from the liquid phase in any suitable manner, such as by filtration or centrifuging and washed substantially free of alkali with absolute ethyl alcohol and petroleum ether or any other solvent suitable to remove alcohol and readily volatile in vacuum, preferably, the potassium salt substantially devoid of free alkali is dried in a vacuum.

Phytochlorin e may be readily identified in solution by its characteristic absorption spectra. Thus, this tri-carboxylic acid having four pyrrol nuclei joined in the alpha positions by methine groups and having the system of conjugated double bonds conforming to the phytochlorin structure has absorption spectrum maxima at 666, 609, 558, 531 and 500 millimicrons as the sodium salt with the sequence of intensities in the order I, V, IV, II, III.

The bacteriostatic properties of phytochlorin e have been investigated with special attention to the effect upon tubercle bacilli of both avian and human strains. For this purpose 25 milligrams of phytochlorin e sodium were dissolved in 100 cc. portions of 4 percent glycerine broth or Sauton's medium in 250 cc. Erlenmeyer flasks and the solution sterilized in the Arnold for 45 minutes on two successive days. The pH value of the medium was determined by the glass electrode and found to be about 7.15 to about 7.60. A plurality of flasks containing the several media containing phytochlorin e sodium in the above concentration were inocculated with young actively growing pellicles of avian or human-37 tubercle bacilli and incubated at 37° C. in the dark for periods of about 21 to about 42 days. Examination of the data obtained by the foregoing tests shows that the phytochlorin e definitely retarded the growth of both the avian and the human strains of tubercle bacilli. The inocula on the media containing phytochlorin e showed very slight filmy growths while the control bacilli showed luxuriant growths covering the whole surfaces of the flask and encroaching on the side walls. To test the viability of the bacilli which had been incubated in the presence of phytochlorin e transplants were made into control media free from phytochlorin e. Normal luxuriant growth of the avian strain occurred within 9 days and the bacilli of the human-37 strain showed good growth in 16 days indicating that the compounds were bacteriostatic in the concentrations used. Both organisms on all media retained their original morphological and acid-fast properties. Repetition of the foregoing tests but using an amount of phytochlorin $e$ equivalent to 0.050% was made and found to be effective.

Although the present invention has been described in conjunction with certain preferred embodiments thereof, variations and modifications may be made as those skilled in the art will readily understand. Such variations and modifications it is to be understood are within the purview of the specification and the scope of the appended claims. Thus, in the following tabulation are provided the descriptive names of the various materials described hereinbefore in accordance with the nomenclature of the Geneva convention as is understood by those skilled in the art:

Pheophytin $a$=1,3,5,8 – tetramethyl – 4 – ethyl-2-vinyl-9-oxo-10-carbmethoxy-phorbine-7-propionic acid phytyl ester.

Phytochlorin $e$=1,3,5,8 – tetramethyl-4-ethyl-2-vinyl-chlorine-6-carbonic acid – gamma-acetic acid-7-propionic acid.

Tri-sodium salt of phytochlorin $e$=1,3,5,8-tetramethyl-4-ethyl-2-vinyl-chlorine – 6 – carbonic acid-gamma-acetic acid-7-propionic acid tri-sodium salt.

Chlorophyll $a$=magnesium complex of 1,3,5,8-tetramethyl-4-ethyl – 2 – vinyl-9-oxo-10-carbmethoxy-phorbine-7-propionic acid phytyl ester.

Chlorophyll $b$=magnesium complex of 1,5,8-trimethyl-4-ethyl- 2 –vinyl- 3 –formyl-9-oxo-10-carbmethoxy-phorbine-7-propionic acid phytyl ester.

Isochlorophyllin $a$=magnesium complex of 1,3,5,8-tetramethyl-4-ethyl-2-vinyl-chlorine-6-carbonic acid-gamma-acetic acid-7-propionic acid.

Isochlorophyllin $b$=magnesium complex of 1,5,8-trimethyl-4-ethyl-2-vinyl- 3 –formyl-chlorine-6-carbonic acid-gamma-acetic acid-7-propionic acid.

The present application is a division in part and a continuation in part of my co-pending application Serial No. 258,175, filed February 24, 1939.

I claim:

1. The process of making tri-sodium salt of phytochlorin $e$ which comprises adding one part by weight of commercially pure pheophytin $a$ to ten parts by weight of a concentrated solution of sodium hydroxide in 98% methyl alcohol to form a mixture, boiling said mixture under a reflux condenser for about 7 hours in the absence of carbon dioxide, cooling said boiled mixture to about 10° C., maintaining said boiled mixture at about 10° C. for about 12 hours until a precipitate containing the tri-sodium salt of phytochlorin $e$ is obtained, separating said precipitate containing the tri-sodium salt of phytochlorin $e$ from the boiled mixture, washing said precipitate containing the tri-sodium salt of phytochlorin $e$ free of alkali with absolute alcohol and then with petroleum ether and drying said washed precipitate containing the tri-sodium salt of phytochlorin $e$ in a vacuum.

2. A process of making the tri-potassium salt of phytochlorin $e$ which comprises adding one part of substantially pure pheophytin $a$ to ten parts of a solution of potassium hydroxide in methyl alcohol to form a reaction mixture, said solution of potassium hydroxide comprising one part by weight of potassium hydroxide in 5 parts by weight of 98% methyl alcohol, boiling said reaction mixture under a reflux condenser for about 5 hours in the absence of carbon dioxide, cooling the reaction mixture for about 12 hours until a precipitate containing the tri-potassium salt of phytochlorin $e$ is obtained, separating said precipitate containing the tri-potassium salt of phytochlorin $e$ from the reaction mass, washing said precipitate substantially free of alkali with absolute ethyl alcohol and petroleum ether to obtain purified tri-potassium salt of phytochlorin $e$, and drying said purified tri-potassium salt of phytochlorin $e$ in a vacuum.

3. A process of making the tri-potassium salt of phytochlorin $e$ which comprises adding one part of substantially pure pheophytin $a$ to ten parts of a solution of potassium hydroxide in methyl alcohol having a concentration of about 12% to about 30% potassium hydroxide to form a reaction mixture, refluxing said reaction mixture in the absence of carbon dioxide for several hours, cooling said reaction mixture to a low temperature and maintaining said reaction mixture at said low temperature until a precipitate containing the tri-potassium salt of phytochlorin $e$ is obtained, separating said precipitate containing the tri-potassium salt of phytochlorin $e$ from the reaction mixture, washing said precipitate with a solvent for potassium hydroxide and methyl alcohol and readily volatile in vacuum until said precipitate containing the tri-potassium salt of phytochlorin $e$ is substantially free of alkali to obtain the tri-potassium salt of phytochlorin $e$ substantially devoid of free alkali, and drying said potassium salt of phytochlorin $e$ substantially devoid of free alkali in a vacuum.

4. A process for making a tri-alkali metal salt of phytochlorin $e$ which comprises reacting a mixture of a pheophorbide and a solution of an alkali metal hydroxide in methyl alcohol, refluxing said mixture for a period of time while excluding carbon dioxide, cooling said refluxed mixture to at least 10° C., allowing said cooled mixture to stand at at least 10° C. until a precipitate containing a tri-alkali metal salt of phytochlorin $e$ is obtained, separating said precipitate containing a tri-alkali metal salt of phytochlorin $e$ from said mixture, washing said precipitate containing a tri-alkali metal salt of phytochlorin $e$ with absolute ethyl alcohol until substantially free of alkali, washing said substantially alkali-free precipitate containing the tri-alkali metal salt of phytochlorin $e$ with petroleum ether to obtain a tri-alkali metal salt of phytochlorin $e$ substantially devoid of free alkali, and drying said tri-alkali metal salt of phytochlorin $e$ substantially free of free alkali in a vacuum.

5. A process of making a trisodium salt of phytochlorin $e$ which comprises refluxing a mixture of a pheophorbide $a$ and a concentrated methyl alcohol solution of sodium hydroxide for a period of time until the reaction to produce the trisodium salt of phytochlorin $e$ is practically complete, cooling said refluxed mixture to a temperature not above about 10° C., maintaining said cooled mixture at the aforesaid temperature until an impure precipitate of the trisodium salt of phytochlorin $e$ is obtained, separating the precipitate of impure trisodium salt of phytochlorin $e$ from the cooled mixture, washing said precipitate of impure trisodium salt of phytochlorin $e$ with absolute ethyl alcohol until substantially free of alkali, washing said precipitate of trisodium salt of phytochlorin $e$ substantially devoid of free alkali with petroleum ether and drying said ether-washed precipitate of the trisodium salt of phytochlorin $e$ substantially free of alkali in a vacuum.

ERIC G. SNYDER.